United States Patent [19]
Tanaka et al.

[11] Patent Number: 5,214,091
[45] Date of Patent: May 25, 1993

[54] THERMOPLASTIC RESIN COMPOSITION

[75] Inventors: Hisao Tanaka, Ichihara; Sumio Hara, Sodegaura, both of Japan

[73] Assignee: Sumitomo Chemical Company, Limited, Osaka, Japan

[21] Appl. No.: 846,126

[22] Filed: Mar. 4, 1992

[30] Foreign Application Priority Data

Mar. 5, 1991 [JP] Japan .................. 3-038437
Apr. 30, 1991 [JP] Japan .................. 3-099001

[51] Int. Cl.$^5$ .............................................. C08K 3/26
[52] U.S. Cl. ................... 524/425; 524/426; 524/427; 524/451; 524/547; 524/567; 524/568; 524/563; 524/566; 524/575; 524/576; 524/579; 524/584; 524/586; 524/589; 524/606; 524/612; 525/56; 252/509; 252/511
[58] Field of Search ............... 252/509, 511; 524/426, 524/425, 427, 451, 547, 567, 568, 563, 566, 575, 576, 579, 584, 586, 589, 606, 612; 525/56, 58

[56] References Cited

U.S. PATENT DOCUMENTS

| | | | |
|---|---|---|---|
| 2,396,210 | 3/1946 | Sharkey | 260/79 |
| 2,434,179 | 1/1948 | Sharkey | 260/90 |
| 3,857,754 | 12/1974 | Hirata et al. | 525/58 X |
| 4,284,550 | 8/1981 | Mizuno et al. | 525/175 X |
| 4,503,102 | 3/1985 | Mollison | 428/35 |
| 4,611,029 | 9/1986 | Takahashi | 525/61 |
| 4,614,781 | 9/1986 | Hori et al. | 525/330.6 |
| 4,774,284 | 9/1988 | Iwasa | 525/58 X |
| 4,844,959 | 7/1989 | Read et al. | 525/58 X |
| 4,994,508 | 2/1991 | Shiraki et al. | 525/57 X |
| 5,024,897 | 6/1991 | Mason et al. | 525/58 X |

FOREIGN PATENT DOCUMENTS

| | | |
|---|---|---|
| 0109824 | 5/1984 | European Pat. Off. . |
| 0152911 | 8/1985 | European Pat. Off. . |
| 228288 | 10/1985 | German Democratic Rep. . |
| 55-165934 | 12/1980 | Japan . |
| 57-73035 | 5/1982 | Japan . |
| 57-180647 | 11/1982 | Japan . |
| 59-15345 | 4/1984 | Japan . |

OTHER PUBLICATIONS

Derwent Publications, Ltd. London, GB; AN 86-254888 & JP-A-61 181 859 (Mitsubishi), Aug. 14, 1986.
Derwent Publications, Ltd., London, GB; AN 87-039064 JP-A-293 540 (Lion), Dec. 24, 1986.
Journal Of Polymer Science: Polymer Physics Edition, vol. 17, 645-654 (1979), Endo et al.: "Solution Behavior of [(Ethylene-co-Vinyl Alcohol)-g-Ethylene Oxide] Graft Copolymers".
Kobunshi Ronbunshu, vol. 36, No. 7, pp. 455-458 (Jul. 1979), Endo et al.: "Surface Tension of Aqueous Solution of Poly[(ethylene-co-vinyl alcohol)-g-(ethylene oxide)]".
Kobunshi Ronbunshu, vol. 36, No. 7, pp. 489-494 (Jul. 1979), Endo et al.: "Anionic Graft Copolymerization of Ethylene Oxide onto Poly(ethylene-co-vinyl alcohol)."

Primary Examiner—Joseph L. Schofer
Assistant Examiner—J. M. Reddick
Attorney, Agent, or Firm—Stevens, Davis, Miller & Mosher

[57] ABSTRACT

Disclosed in this invention is a thermoplastic resin composition comprising a thermoplastic resin, a conductive inorganic filler and/or a non-conductive inorganic filler, and an adduct of an ethylene oxide with a saponified product of a copolymer of ethylene and a vinyl ester of a saturated carboxylic acid. The adduct of an alkylene oxide with a saponified product of a copolymer of ethylene and a vinyl ester of a carboxylic acid is an additive having excellent compatibility with the thermoplastic resin and useful for improving dispersibility of the inorganic filler.

14 Claims, No Drawings

THERMOPLASTIC RESIN COMPOSITION

The present invention relates to a thermoplastic resin composition. More particularly, the invention pertains to a thermoplastic resin composition comprising a thermoplastic resin, a conductive inorganic filler and/or a non-conductive inorganic filler and an adduct of an alkylene oxide with a saponified product of a copolymer of ethylene and a vinyl ester of a saturated carboxylic acid.

The composition obtained according to the present invention can be effectively used for packaging materials such as films and laminates, molded products such as vessels and containers, various sundry goods and other commercial products. Especially the composition of this invention blended with a conductive inorganic filler finds its particularly useful application to the products which are required to have an antistatic function, such as packages and transport containers of the materials which are vulnerable to damage by electrical factors.

Addition of a conductive inorganic filler and/or a non-conductive inorganic filler to a thermoplastic resin has been commonly practiced for the purposes of improvement of mechanical properties of the resin, prevention of static charging by affording conductivity, utilization of the resin as a semiconductor by making it conductive to a small amount of electric current, cost reduction or environmental protection by no or minimized use of plastic materials, lowering of load of incineration installation by reduction of combustion calorie at incineration of waste plastic materials, etc. For instance, carbon black, calcium carbonate, talc or like substance is mixed with a polyolefin such as polyethylene or polypropylene and the mixture is worked into a film or other commercial products by sheeting, molding or other means.

However, in order to afford desired conductivity to thermoplastic resin, it is necessary to add a large quantity of conductive inorganic filler, and it is known that such addition of conductive inorganic filler tends to cause local variation of electroconductivity due to improper dispersion of the filler.

Further, addition of a large amount of conductive inorganic filler gives rise to the problem that not only is impaired flexibility of the resin to make it difficult to perform molding but also deteriorated are the mechanical properties of the resin.

Also, in case a non-conductive inorganic filler is added to thermoplastic resin, since making is mechanical and attended by no chemical change, it is hard to obtain a uniform film or molded article due to improper dispersion of the filler, and the mechanical properties of the resin are also deteriorated.

Voluminous addition of non-conductive inorganic filler leads to the problem of adverse effect on resin properties, such as impairment of flexibility of the resin or reduction of its strength.

In some cases, the non-conductive inorganic filler comes up in the form of powder on the resin surface, resulting in making a pollutive film or molded article.

As a measure against this phenomenon, it has been suggested to blend an additive that can serve as a binder, but an additive with low compatibility with polyolefin resin tends to migrate itself to the resin surface to give rise to the problem of tackiness or pollution.

As a solution to this problem, there have been proposed polyolefin resin compositions comprising ethylene oxide and/or propylene oxide polymers as disclosed in Japanese Patent Application Kokai (Laid-Open) No. 55-165934. However, such liquid polymers are not so well in compatibility with resins and tend to transfer to the resin surface with lapse of time to cause surface tackiness.

The present invention relates to a thermoplastic resin composition which is free of said problems and that has been realized as a result of extensive researches on the additives having good compatibility with resins and capable of well dispersing inorganic fillers while maintaining the innate properties of resins, especially by trying addition of conductive inorganic fillers and/or non-conductive inorganic fillers.

More specifically, the present invention pertains to a thermoplastic resin composition prepared by blending a conductive inorganic filler and/or a non-conductive inorganic filler such as carbon black, calcium carbonate, talc, etc., and an adduct of an alkylene oxide (e.g. ethylene oxide) with a saponified product of a copolymer of ethylene and a vinyl ester of a saturated carboxylic acid (e.g. vinyl acetate) copolymer with a thermoplastic resin such as polyethylene or polypropylene.

The "thermoplastic resin" used in the present invention refers generically to the plastic materials which are softened to become plastic when heated and are solidified when cooled. Examples of such thermoplastic resins include polyethylene (low density polyethylene, linear low-density polyethylene, high density polyethylene, etc.), polypropylene (propylene homopolymer, propylene-ethylene random copolymer, propylene-ethylene block copolymer, etc.), ethylenepropylene copolymer resin, ethylene-butene-1 copolymer resin, poly(4-methyl-1-pentene), polystyrene, rubber-modified polystyrene, polyvinyl chloride, polyvinylidene chloride, ethylene-vinyl acetate copolymer, styreneacrylonitrile copolymer, polyamides, polyacetals, polycarbonates, polyphenylene ether, polysulfone, polyester, thermoplastic polyurethane, styrene-butadieneacrylonitrile copolymer and thermoplastic elastomers. The modified versions of these resins are also usable. Further, these resins may be used either singly or in admixture or in the form of polyblend.

Typical examples of the conductive inorganic fillers usable in this invention are carbon blacks such as furnace black, thermal black and acetylene black, silver glass beads, metalloplastic, carbon fiber, fine metal powder and their surface treated products. These fillers may be used either singly or in combination.

Examples of the non-conductive inorganic fillers usable in this invention include calcium carbonate, talc, clay, silica, silica-alumina, hydrotalcite, barium sulfate, mica, glass fiber, glass powder and other like inorganic compounds. The surface treated versions of these substances are also usable. These substances may be used either singly or in combination.

In the present invention, conductive inorganic filler is added preferably in an amount of 1–100 parts by weight to 100 parts by weight of thermoplastic resin. When the content of the filler is less than 1 part by weight, the intended object of addition of the filler can not be attained to a satisfactory degree, while when the filler content is greater than 100 parts by weight, the properties of thermoplastic resin are greatly impaired to hamper practical serviceability of the produced film or molded article.

The content of non-conductive inorganic filler, when such filler is used, is preferably 5–70 parts by weight to 30–95 parts by weight of thermoplastic resin. When the content is less than 5 parts by weight, the object of addition of the filler can be attained to a satisfactory degree, while when the content exceeds 70 parts by weight, the properties of thermoplastic resin are greatly impaired to hamper practical serviceability of the produced film or molded article.

In the adduct of an alkylene oxide with a saponified product of a copolymer of ethylene and a vinyl ester of a saturated carboxylic acid used in the present invention, the ethylene-saturated vinyl carboxylate copolymer can be prepared by a known method, for example, high-pressure gaseous phase radical polymerization.

The vinyl ester of a saturated carboxylic acid usable for said purpose in this invention are not limited to specific types but a variety of said ester can be used. Typical examples of such esters are vinyl acetate, vinyl propionate, vinyl butyrate and the like. Among them, vinyl acetate is especially preferred.

In copolymerization of ethylene and a vinyl ester of a saturated carboxylic acid, a small quantity of an alkyl ester of an unsaturated carboxylic acid, such as methyl acrylate or methyl methacrylate may be allowed to coexist to form a multiple polymer.

Ethylene content in and number-average molecular weight of the copolymer of ethylene and a vinyl ester of a saturated carboxylic acid are not specifically defined, but they are preferably in the ranges of 1–90 wt. % and 1,000–20,000, respectively.

The "adduct of an alkylene oxide with a saponified product of a copolymer of ethylene and a vinyl ester of a saturated carboxylic acid" (which may hereinafter be referred to simply as "adduct") used in the present invention is a product obtained by adding an alkylene oxide to a saponified product of a copolymer of ethylene and a vinyl ester of a saturated carboxylic acid.

As for alkylene oxide, it is possible to use various types of alkylene oxide available in the art. Such alkylene oxides, to cite a few examples, include ethylene oxide, propylene oxide and butylene oxide. These alkylene oxides may be used either singly or by adding two or more of them blockwise or randomly. Ethylene oxide is especially preferred for use in this invention.

The degree of saponification of the saponified product of a copolymer of ethylene and a vinyl ester of a saturated carboxylic acid is not specified, but it is preferably in the range of 30–100%, more preferably 50–100%.

The amount of the alkylene oxide relative to the saponified product of a copolymer of ethylene and a vinyl ester of a saturated carboxylic acid is also not subject to specific restrictions, but it is usually desirable that the amount of alkylene oxide is 20–1,000 parts by weight, more preferably 100–600 parts by weight, to 100 parts by weight of said saponified product.

Any suitable method may be used for preparing the adduct used in the present invention. For instance, it may be obtained in the following way.

Firstly, a copolymer of ethylene and a vinyl ester of a saturated carboxylic acid is heated in alcohol in the presence of an alkali to obtain a saponified product of said copolymer. Then this saponified product is further heated and reacted in the presence of an alkylene oxide and an alkali. This reaction yields the adduct usable in the present invention.

The amount of the adduct to be added in the composition containing a conductive inorganic filler is preferably in the range of 1–40 parts by weight, more preferably 3–30 parts by weight, to 100 parts by weight of thermoplastic resin and 1–100 parts by weight of conductive inorganic filler. When the content of the adduct is less than 1 part by weight, its effect of dispersing the conductive inorganic filler and the effect of improving conductivity are impractically low. When the content is higher than 40 parts by weight, the innate properties, such as strength, of thermoplastic resin may be impaired.

In the case of the composition containing a non-conductive inorganic filler, the content of the adduct in the composition is preferably in the range of 0.1–10 parts by weight, more preferably 1–8 parts by weight, to 30–95 parts by weight of thermoplastic resin and 5–70 parts by weight of non-conductive inorganic filler. When the content of the adduct is less than 1 part by weight, its effect of dispersing the non-conductive inorganic filler and the effect of improving conductivity are unsatisfactory. When the content exceeds 10 parts by weight, the innate properties, such as strength, of thermoplastic resin may be impaired.

In the present invention, no specific restrictions are imposed on the method for obtaining a thermoplastic resin composition comprising a thermoplastic resin, a conductive inorganic filler and/or a non-conductive inorganic filler and an adduct. For instance, there can be used a method in which a thermoplastic resin, a conductive and/or a non-conductive inorganic filler and an adduct are added severally at the fusing temperature of the thermoplastic resin or a method in which two of said substances are mixed first and then the remaining substance is added and mixed. The mixing means used in this process can be properly selected from the generally employed mixing machines and means such as Banbury mixer, open roll mill, kneader, Henschel mixer, single- or double-screw extruder and the like.

The thermoplastic resin composition of the present invention may contain, as required, a heat stabilizer, antioxidant, light stabilizer, lubricant, anticlouding agent, pigment, foaming agent, fluorescent agent, flame retardant, releasing agent, processing aid, reinforcing agent, etc., which are generally accepted as additives to thermoplastic resins.

Hereinafter, the effect of the present invention will be described more particularly by showing the examples thereof as well as the comparative examples. It is to be understood, however, that the examples shown below are merely intended to be illustrative and not to be construed as limiting the scope of the invention.

Starting materials

Resin: linear low-density polyethylene (Sumikathene ® αFZ-104, Sumitomo Chemical Industries)

Carbon black: furnace black (Seast ® SO, Tokai Carbon)

Adduct: see Examples

Evaluation methods (In each case, evaluation was made after one-week preservation at 23° C. after formation of sheet)

Fouling on sheet surface: Staining of carbon and adduct was examined by touching the sheet surface with fingertips.

Tensile test: Measured according to JIS K6730 (1981).

Volume resistivity: Measured with a super insulation resistance tester (Model SM-10E, Towa Denpa Kogyo)

EXAMPLES 1-3

A linear low-density polyethylene, carbon black and an adduct of 200% ethylene oxide with a 90% saponified product of a copolymer of ethylene and vinyl acetate having an ethylene content of 31% and a number-average molecular weight of 1,900 (adduct 1) were kneaded together, in the amount ratios shown in Table 1, by a Banbury mixer at 150° C. for 10 minutes. Each mixture was molded into a 1 mm thick sheet by a press molding machine at 160° C. Visual appearance, tensile properties and electrical resistance of the obtained sheets are shown collectively in Table 1.

COMPARATIVE EXAMPLES 1-2

A linear low-density polyethylene and carbon black were kneaded together in the amount ratios shown in Table 1 and then worked into a sheet in the same way as Example 1. The obtained sheets were subjected to the same examinations as made in Examples 1-3, the results being shown collectively in Table 1.

TABLE 1

| | Amount of resin added, wt. parts | Amount of carbon black added, wt. parts | Adduct Type | Adduct Amount added, wt. parts | Fouling on sheet surface | Tensile properties Strength $kg/cm^2$ | Tensile properties Elongation % | Volume resistivity, $\Omega.cm$ |
|---|---|---|---|---|---|---|---|---|
| Example 1 | 80 | 20 | 1 | 5 | None | 250 | 625 | $10^6$ |
| Example 2 | 80 | 20 | 1 | 10 | " | 250 | 675 | $10^6$ |
| Example 3 | 80 | 15 | 1 | 5 | " | 250 | 575 | $10^7$ |
| Comp. Example 1 | 80 | 20 | None | 0 | Slight | 280 | 650 | $10^{13}$ |
| Comp. Example 2 | 80 | 15 | " | 0 | " | 300 | 675 | $10^{16}$ |

EXAMPLE 4

The procedure of Example 1 was followed except for use of an adduct of 200% ethylene oxide with a 60% saponified product of a copolymer of ethylene and vinyl acetate having an ethylene content of 31% and a number-average molecular weight of 1,900 (adduct 2) to obtain a sheet and its visual appearance, tensile properties and volume resistivity were determined in the same ways as practiced in Example 1. The results are shown collectively in Table 2.

EXAMPLE 5

The procedure of Example 1 was followed except for use of an adduct of 500% ethylene oxide with a 90% saponified product of a copolymer of ethylene and vinyl acetate having an ethylene content of 31% and a number-average molecular weight of 1,900 (adduct 3) to obtain a sheet and its visual appearance, tensile properties and volume resistivity were determined in the manners described above, the results being shown collectively in Table 2.

EXAMPLE 6

The procedure of Example 1 was followed except for use of an adduct of 200% ethylene oxide with a 90% saponified product of a copolymer of ethylene and vinyl acetate having an ethylene content of 31% and a number-average molecular weight of 2,400 (adduct 4) to obtain a sheet and its visual appearance, tensile properties and volume resistivity were determined as in the previous examples, the results being shown collectively in Table 2.

TABLE 2

| | Amount of resin added, wt. parts | Amount of carbon black added, wt. parts | Adduct Type | Adduct Amount added, wt. parts | Fouling on sheet surface | Tensile properties Strength $kg/cm^2$ | Tensile properties Elongation % | Volume resistivity, $\Omega.cm$ |
|---|---|---|---|---|---|---|---|---|
| Example 4 | 80 | 15 | 2 | 5 | None | 250 | 650 | $10^7$ |
| Example 5 | " | " | 3 | 5 | " | 250 | 625 | $10^7$ |
| Example 6 | " | " | 4 | 5 | " | 260 | 650 | $10^7$ |

COMPARATIVE EXAMPLE 3

A sheet was made by following the same procedure as Example 1 except that 5 parts of polyethylene glycol having a molecular weight of 4,000 was added in place of adduct 1, and this sheet was examined as in Example 1. The surface of the pressed sheet had tackiness and slight whitening due to exudation of polyethylene glycol, and the sheet could not stand determination of properties.

Starting materials

Resin: low density polyethylene (Sumikathene® L-705, Sumitomo Chemical Industries)

Calcium Carbonate: heavy calcium carbonate (NS-200, Nitto Funka Kogyo)

Adduct: See Examples

Evaluation methods (In each case, evaluation was made after one-week preservation at 23° C. after formation of sheet.)

Surface condition of sheet: The sheet surface was observed to see whether there was unevenness in mixing of calcium carbonate or staining of the adduct or polyethylene glycol. When the sheet surface was free of them, it was judged as "good", and when it had such unevenness and/or staining, it was judged as "poor".

Tensile test: Measured according to JIS K6730 (1981).

EXAMPLES 7 AND 8

A low density polyethylene, calcium carbonate and an adduct of 200% ethylene oxide with a 90% saponified product of a copolymer of ethylene and vinyl acetate having an ethylene content of 31% and a number-average molecular weight of 1,900 (adduct 1) were kneaded together, in the amount ratios shown in Table 3, by a Banbury mixer at 150° C. for 10 minutes. Each mixture was molded into a 1 mm thick sheet by a press molding machine at 160° C. Visual appearance and tensile properties of the obtained sheets are shown in Table 3.

EXAMPLES 9 AND 10

The procedure of Example 7 was followed except for use of adduct 2 to obtain the sheets and their visual appearance and tensile properties were examined. The results are shown in Table 3.

EXAMPLES 11 AND 12

The procedure of Example 7 was followed except for use of adduct 3 to obtain the sheets and their visual appearance and tensile properties were examined, the results being shown in Table 3.

EXAMPLES 13 AND 14

The procedure of Example 7 was followed except for use of adduct 4 to obtain the sheets and their visual appearance and tensile properties were examined. The results are shown in Table 3.

als were subjected to high-speed stirring for 3 minutes to obtain a powdery mixture.

75 parts of high impact polystyrene (Sumibrite® M540 made by Sumitomo Chemical Co.) and 25 parts of said powdery mixture were dry blended and supplied into a twin-screw extruder (TEX® 30, Nippon Steel Works) by which the blend was kneaded at 230° C. and extruded into a strand. The strand was cut into pellets of about 5 mm and dried.

The pellets were injection molded into the property evaluation test pieces in a mold for the test piece (temp.: 40° C.) at die temperature of 230° C. by using a 5-ounce injection molding machine (IS100EN, Toshiba Machinery).

The results of property determinations of the test pieces showed that as compared with original polystyrene, melt flow rate (measured according to JISK-7112) increased from 12 g/10 min to 25 g/10 min, tensile strength at break in the tensile test (conducted according to JISK 7133) lowered from 150 kg/cm$^2$ to 145 kg/cm$^2$ elongation at break increased from 41% to 48% and volume resistivity (measured by Towa Denpa's SM10E) lowered from $10^{16}$ Ω.cm down to $10^{11}$ Ω.cm. Thus, there was obtained an excellent antistatic resin without incurring any large variation in mechanical properties.

TABLE 3

| Example No. | Amount of resin added, wt. parts | Amount of calcium carbonate added, wt. parts | Adduct Type | Adduct Amount added, wt. parts | Surface condition of sheet | Tensile properties Strength, kg/cm$^2$ | Tensile properties Elongation, % |
|---|---|---|---|---|---|---|---|
| 7 | 70 | 30 | 1 | 1.0 | Good | 88 | 200 |
| 8 | " | " | " | 2.0 | " | 87 | 300 |
| 9 | " | " | 2 | 1.0 | " | 89 | 200 |
| 10 | " | " | " | 2.0 | " | 87 | 275 |
| 11 | " | " | 3 | 1.0 | " | 90 | 225 |
| 12 | " | " | " | 2.0 | " | 85 | 250 |
| 13 | " | " | 4 | 1.0 | " | 90 | 200 |
| 14 | " | " | " | 2.0 | " | 86 | 250 |

TABLE 4

| Comparative Example No. | Amount of resin added, wt. parts | Amount of calcium carbonate added, wt. parts | Polyethylene glycol Molecular weight | Polyethylene glycol Amount added, wt. parts | Surface condition of sheet | Tensile properties Strength, kg/cm$^2$ | Tensile properties Elongation, % |
|---|---|---|---|---|---|---|---|
| 4 | 70 | 30 | — | 0 | Good | 91 | 100 |
| 5 | " | " | 600 | 1.0 | " | 86 | 140 |
| 6 | " | " | 600 | 2.0 | Poor | 83 | 180 |
| 7 | " | " | 4,000 | 1.0 | " | 84 | 140 |
| 8 | " | " | 4,000 | 2.0 | " | 81 | 160 |

COMPARATIVE EXAMPLES 4–8

A low density polyethylene, calcium carbonate and polyethylene glycol with a molecular weight of 600 or 4,000 were kneaded together, in the amount ratios shown in Table 4, in the same way as Example 7 and the mixtures were molded into the sheets according to Example 7. Visual appearance and tensile properties of the obtained sheets were examined, the results being shown collectively in Table 4.

EXAMPLE 15

12 kg of adduct 1 heated to 80° C. was poured into a 100L Henschel mixer (mfd. by Mitsui Miike Corp.) containing 8 kg of silica (CARPLEX® 1120 produced by Shionogi Pharmaceutical Co., Ltd.), and the materi- As apparent from the above-shown results of the examples of this invention and the comparative examples, the thermoplastic resin composition comprising a thermoplastic resin, a conductive inorganic filler and/or a non-conductive inorganic filler and an adduct of an alkylene oxide with a saponified product of a copolymer of ethylene and a vinyl ester of a saturated carboxylic acid can provide a sheet excellent in visual appearance and also improved in electric conductivity and tensile elongation. It thus provides the improvements over the problems in the prior art and its industrial value is very high.

What is claimed is:

1. A thermoplastic resin composition comprising a thermoplastic resin selected from the group consisting of polyethylene, polypropylene, ethylene-propylene copolymer resin, ethylene-butene-1 copolymer resin, poly(4-methyl-1-pentene), polystyrene, rubber-modified polystyrene, polyvinyl chloride, polyvinylidene chloride, ethylene-vinyl acetate copolymer, styrene-acrylonitrile copolymer, polyamides, polyacetals, polycarbonates, polyphenylene ether, polysulfone, polyester, thermoplastic polyurethane, and styrene-butadieneacrylonitrile copolymer, at least one inorganic filler selected from the group consisting of conductive inorganic fillers and non-conductive inorganic fillers, and an adduct of an alkylene oxide with a saponified product of a copolymer of ethylene and a vinyl ester of a saturated carboxylic acid.

2. The thermoplastic resin composition according to claim 1, comprising 100 parts by weight of the thermoplastic resin, 1-100 parts by weight of the conductive inorganic filler per 100 parts by weight of the thermoplastic resin, and 1-40 parts by weight of the adduct of an alkylene oxide with a saponified product of a copolymer of ethylene and a vinyl ester of a saturated carboxylic acid per 100 parts by weight of the thermoplastic resin.

3. The thermoplastic resin composition according to claim 1, comprising 30-95 parts by weight of the thermoplastic resin, 5-70 parts by weight of the non-conductive inorganic filler, and 0.1-10 parts by weight of the adduct of an alkylene oxide with a saponified product of a copolymer of ethylene and a vinyl ester of a saturated carboxylic acid per 100 parts by weight of both of the thermoplastic resin and the non-conductive inorganic filler.

4. The thermoplastic resin composition according to claim 1, wherein the thermoplastic resin is selected from the group consisting of polyethylene, polypropylene, and mixtures thereof the conductive inorganic filler is carbon black, and the non-conductive inorganic filler is calcium carbonate or talc.

5. The thermoplastic resin composition according to claim 1, wherein the saponified product of a copolymer of ethylene and a vinyl ester of a saturated carboxylic acid in said adduct is a saponified product of a copolymer of ethylene and a vinyl ester of a saturated carboxylic acid having an ethylene unit content of 1-90% by weight based on the weight of the copolymer and a number-average molecular weight of 1,000-10,000, the degree of saponification of said saponified product being 30-100%, and the amount ratio of the alkylene oxide in said adduct is 20-1,000 parts by weight to 100 parts by weight of said saponified product.

6. The thermoplastic resin composition according to claim 1, wherein in the adduct of an alkylene oxide with a saponified product of a copolymer of ethylene and a vinyl ester of a saturated carboxylic acid, the vinyl ester of a saturated carboxylic acid is vinyl acetate and the alkylene oxide is ethylene oxide.

7. The thermoplastic resin composition according to claim 1, wherein the thermoplastic resin is polystyrene and the non-conductive inorganic filler is silica.

8. A thermoplastic resin composition comprising a thermoplastic resin selected from thermoplastic elastomers, at lest one inorganic filler selected from the group consisting of conductive inorganic fillers and non-conductive inorganic fillers, and an adduct of an alkylene oxide with a saponified product of a copolymer of ethylene and a vinyl ester of a saturated carboxylic acid.

9. The thermoplastic resin composition according to claim 8, comprising 100 parts by weight of the thermoplastic resin, 1-100 parts by weight of the conductive inorganic filler per 100 parts by weight of the thermoplastic resin, and 1-40 parts by weight of the adduct of an alkylene oxide with a saponified product of a copolymer of ethylene and a vinyl ester of a saturated carboxylic acid per 100 parts by weight of the thermoplastic resin.

10. The thermoplastic resin composition according to claim 8, comprising 30-95 parts by weight of the thermoplastic resin, 5-70 parts by weight of the non-conductive inorganic filler, and 0.1-10 parts by weight of the adduct of an alkylene oxide with a saponified product of a copolymer of ethylene and a vinyl ester of a saturated carboxylic acid per 100 parts by weight of both the thermoplastic resin and the non-conductive inorganic filler.

11. The thermoplastic resin composition according to claim 8, wherein the conductive inorganic filler is carbon black, and the non-conductive inorganic filler is calcium carbonate or talc.

12. The thermoplastic resin composition according to claim 8, wherein the saponified product of a copolymer of ethylene and a vinyl ester of a saturated carboxylic acid in said adduct is a saponified product of a copolymer of ethylene and a vinyl ester of a saturated carboxylic acid having an ethylene unit content of 1-90% by weight based on the weight of the copolymer and a number-average molecular weight of 1,000-10,000, the degree of saponification of said saponified product being 30-100%, and the amount ratio of the alkylene oxide in said adduct is 20-1,000 parts by weight to 100 parts by weight of said saponified product.

13. The thermoplastic resin composition according to claim 8, wherein in the adduct of an alkylene oxide with a saponified product of a copolymer of ethylene and a vinyl ester of a saturated carboxylic acid, the vinyl ester of a saturated carboxylic acid is vinyl acetate and the alkylene oxide is ethylene oxide.

14. The thermoplastic resin composition according to claim 8, wherein the non-conductive inorganic filler is silica.

* * * * *